(12) United States Patent
Desourdis et al.

(10) Patent No.: US 7,624,696 B2
(45) Date of Patent: Dec. 1, 2009

(54) AIR DETECTED LIGHT REFLECTING MODULAR BEACON SYSTEM

(76) Inventors: Normand Desourdis, 1010-A, Iberville, Repentigny, Quebec (CA) J5Y 3B1; Pierre Gervais, 4270, Belmont, Laval, Quebec (CA) H7B 1C8

(*) Notice: Subject to any disclaimer, the term of this patent is extended or adjusted under 35 U.S.C. 154(b) by 36 days.

(21) Appl. No.: 11/453,595

(22) Filed: Jun. 15, 2006

(65) Prior Publication Data
US 2007/0013559 A1 Jan. 18, 2007

Related U.S. Application Data

(60) Provisional application No. 60/691,674, filed on Jun. 20, 2005.

(51) Int. Cl.
*E01F 9/00* (2006.01)
*B64F 1/20* (2006.01)

(52) U.S. Cl. .................. 116/63 R; 116/63 P; 40/217; 40/612

(58) Field of Classification Search ............ 116/63 R, 116/63 P, 209, DIG. 16, DIG. 17; 40/217, 40/612, 605, 582, 606.01, 606.17, 610; 404/6, 404/9, 10; 340/947, 950, 951, 953
See application file for complete search history.

(56) References Cited

U.S. PATENT DOCUMENTS

| 1,534,084 A | * | 4/1925 | Schouboe | 40/612 |
| 1,866,199 A | * | 7/1932 | Edwards | 40/217 |
| 2,221,606 A | | 11/1940 | Piacentini | |
| 2,455,721 A | * | 12/1948 | Abiuso | 40/217 |
| 3,094,848 A | | 6/1963 | Albrecht | |
| 3,334,554 A | * | 8/1967 | Adams | 116/63 P |
| 3,572,942 A | | 3/1971 | teKronnie et al. | |
| 3,984,069 A | | 10/1976 | Heyworth | |
| 4,248,001 A | | 2/1981 | Feuvray | |
| 4,277,923 A | | 7/1981 | Rebentisch et al. | |
| 4,598,510 A | | 7/1986 | Wagner | |
| 4,687,369 A | * | 8/1987 | McDonald | 404/12 |
| 4,759,162 A | | 7/1988 | Wyse | |
| 4,879,965 A | | 11/1989 | Valley | |
| 5,022,739 A | | 6/1991 | Bennett et al. | |
| 5,122,797 A | * | 6/1992 | Wanasz | 340/908.1 |
| 5,175,645 A | | 12/1992 | Bennett et al. | |
| 5,335,112 A | | 8/1994 | Bennett | |
| 5,832,867 A | * | 11/1998 | Whicker, Jr. | 116/209 |
| 6,106,186 A | | 8/2000 | Taipale et al. | |
| 6,293,678 B1 | | 9/2001 | Schieferstein | |
| 6,452,509 B2 | | 9/2002 | Ersson | |
| 6,708,643 B2 | | 3/2004 | Traiforos | |
| 6,733,204 B1 | * | 5/2004 | Paniccia | 404/6 |
| 6,786,173 B2 | * | 9/2004 | Courtemanche | 116/63 P |
| 6,836,222 B1 | * | 12/2004 | Carini | 340/908.1 |
| 6,948,446 B2 | * | 9/2005 | Greves | 116/63 P |
| 7,302,908 B1 | * | 12/2007 | Bieberdorf | 116/63 P |
| 2002/0104472 A1 | * | 8/2002 | Neubert | 116/209 |
| 2003/0196360 A1 | * | 10/2003 | Colip | 40/610 |
| 2006/0232443 A1 | * | 10/2006 | Brown | 340/953 |

* cited by examiner

*Primary Examiner*—Amy Cohen Johnson (57) ABSTRACT

A modular signaling system for a runway. The signaling system includes a plurality of attachable modules, each particular module from the plurality of modules including a signaling surface, an attachment to attach the particular module to another module from the plurality of modules, and a support connected to the signaling surface. The attachment is connected to the signaling surface and the support is supporting the particular module over the runway.

13 Claims, 9 Drawing Sheets

AIR DETECTED LIGHT REFLECTING MODULAR BEACON SYSTEM

This application claims priority based on provisional application 60/691,674 filed Jun. 20, 2005

FIELD OF THE INVENTION

The present invention relates to beacon systems. More specifically, the present invention is concerned with a modular light reflecting beacon device visible from an in flight airplane.

BACKGROUND OF THE INVENTION

There is often a need to introduce temporary beacon on runways in airports. For example, if a runway is being repaired, there is a need to signal to approaching pilots that the runway is unavailable for landing.

Currently, lime is used to write a sign resembling the letter "X" on such a runway. Therefore, a pilot erroneously approaching the closed runway sees the "X" and therefore can clear the runway.

However, lime is dissolved by rain, changes the PH of soil around the runways, and is toxic and therefore cumbersome to apply. In addition, it is very hard to completely remove a mark made with lime from a runway. Also, lime is not reusable. In addition to all these disadvantages, the visibility of lime on runways is only average both during the day and at night.

Another type of temporary beacon for runways consists in a mesh fence. However, such fences are somewhat difficult to see during the day and almost impossible to see at night, even when illuminated.

There are also several types of beacon or marking devices using artificial lighting sources for nighttime illumination as well as some using luminescent means including the use of high reflective material but they are generally setup upright and at the sides of the landing strips and are not used for indicating the closing of a landing strips but rather for more genreal and permanent markings and not for temporary markings that need to be installed or removed quickly.

SUMMARY OF THE INVENTION

In view of the foregoing disadvantages inherent in the known devices now present in the prior art, the present invention, which will be described subsequently in greater detail, is to provide objects and advantages which are:

To provide for a modular beacon system that can be assembled in place relatively quickly.

To provide for a modular beacon system that can be disassembled and taken away relatively quickly.

To provide for a modular beacon system that is clearly and easily visible from the air several kilometers away during daytime.

To provide for a modular beacon system that is clearly and easily visible from the air several kilometers away during nighttime.

To attain these ends, the modular beacon system for a runway has a plurality of attachable modules; each modules including a panel, at least one axle, and at least one attachment; the attachment being connected to the panel; the axle being connected to the attachments; the panel defines a reflecting surface which is made reflective by being coated with a highly reflective substance.

In one embodiment, the axle are supported by a footing resting on ground wherein each footing has an axle inserted partially therethrough., whereas in another embodiment, the axle rest or are implanted directly into the ground or runway.

The panels are generally supported on a frame. In one embodiment, the frame is made of "L" shaped elongated members running the length of the panel and "L" shaped width members running the width of the panel.

Each module has two attachments connected to the frame; the attachments each include two module attachment holes and one support attachment hole extending therethrough.

The modular beacon system has a method of assembly wherein the attachment module is attached to the elongated member through bolts inserted through attachment holes made through the attachment module and through attachment holes made through both the elongated member and the width member; each bolt being maintained within the attachment holes by a nut; axle bolts located on the axle so as to connect the axle to the attachment through a support attachment hole.

The method of installation goes as follows: Modules are positioned on the runway to approximately form a signal; the axles are inserted through the support attachments holes; the modules are attached together through the nuts and bolts.

Preferably although not essential, in a preferred embodiment, the modular beacon system for a runway has its panels assembled so as to be oriented at an angle relative to the runway, a preferred range of angles is between 1 and 5 degrees relative to the runway.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter which contains illustrated preferred embodiments of the invention.

DETAILED DESCRIPTION

Figure 1:
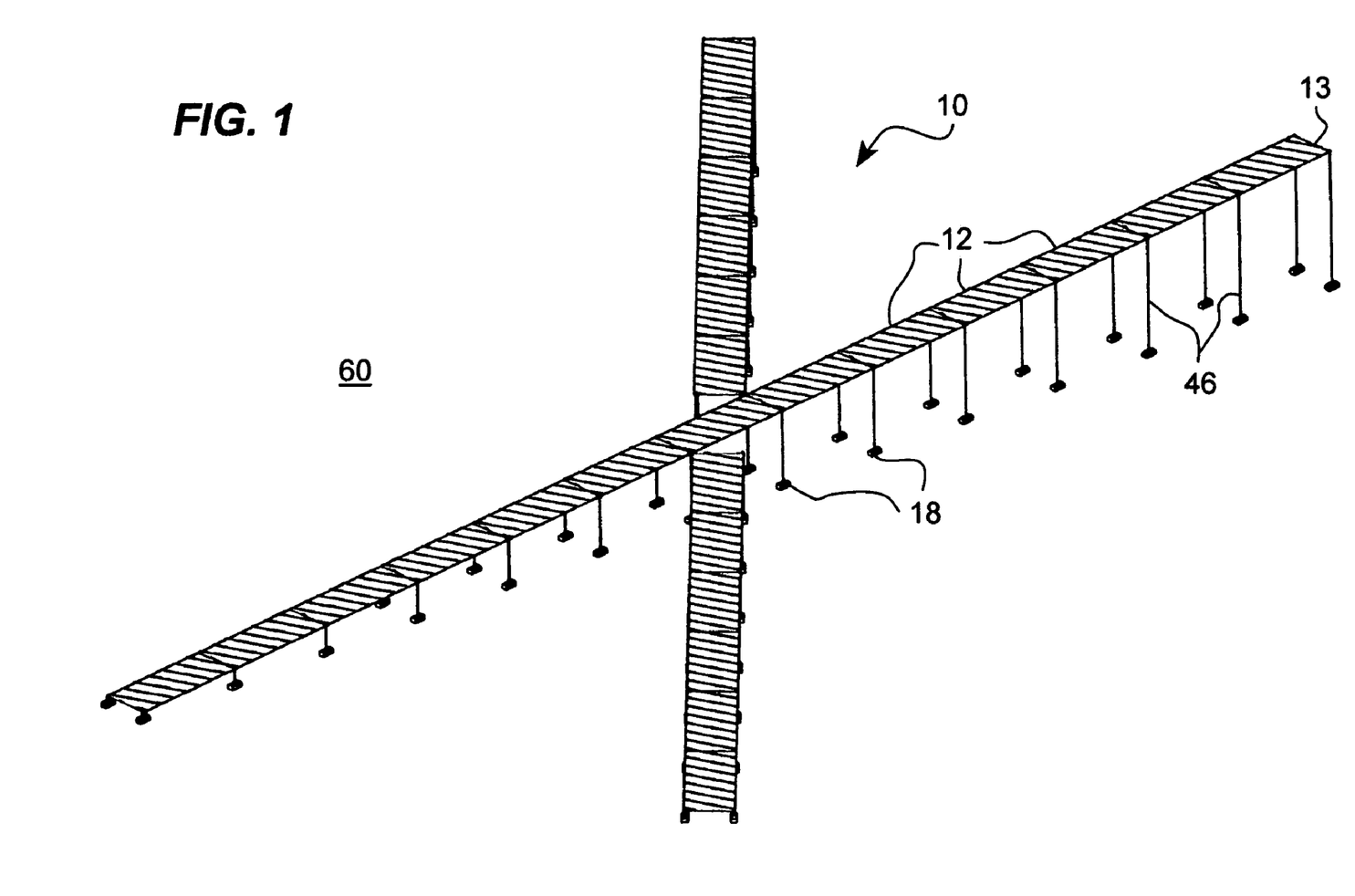
FIG. 1 is a perspective view of a modular beacon system including a plurality of modules as laid out on a runway to indicate that the runway is closed.
Figure 2:
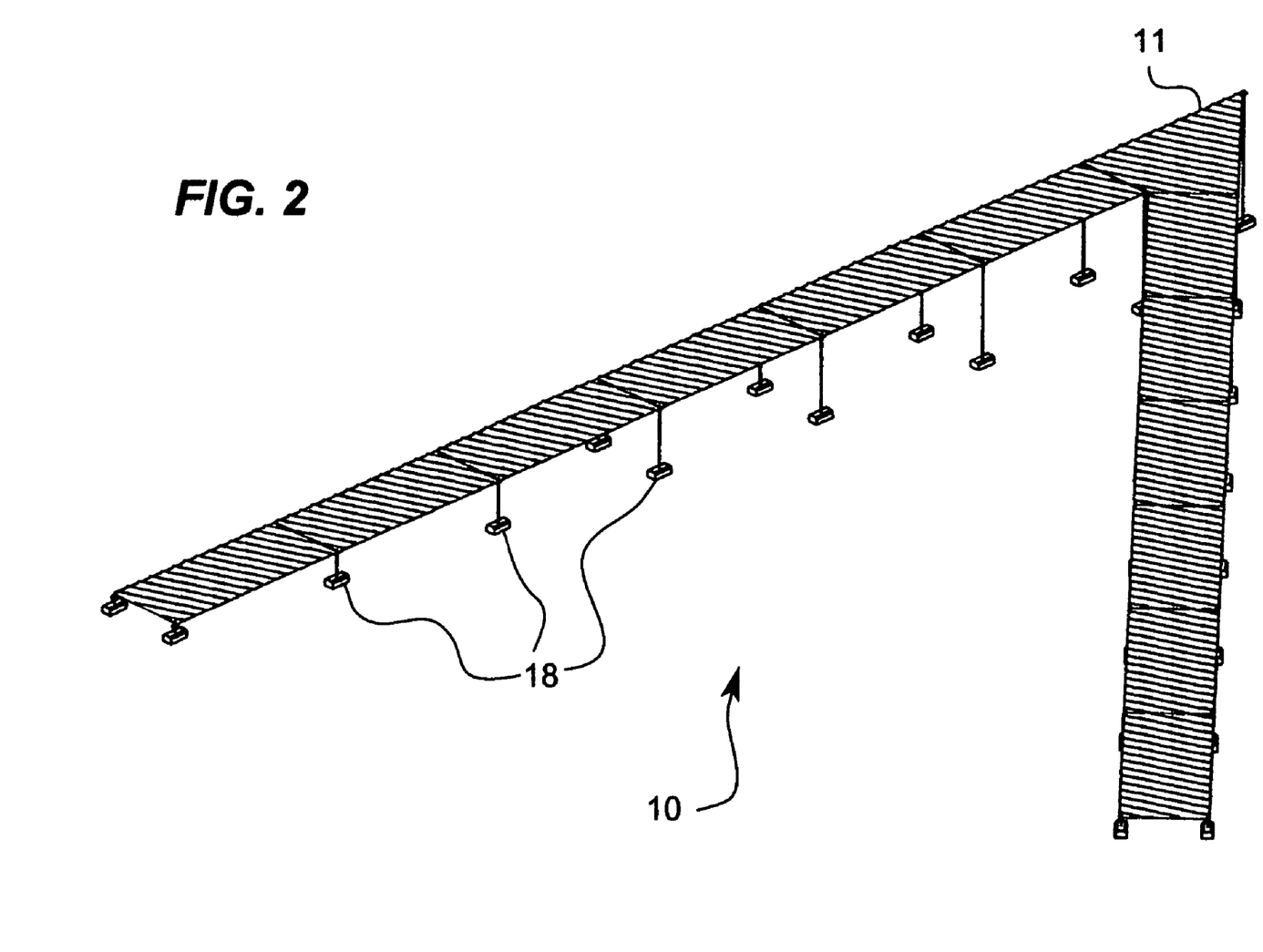
FIG. 2 is a perspective view of a modular beacon system including a plurality of modules as laid out on a runway to indicate that the runway is open.

FIG. 1 shows a modular beacon system (10) for a runway (60). The beacon system (10) includes a plurality of attachable modules (12).

The beacon system (10) allows building temporary or permanent signals for runways. For example a symbol like the letter "X" indicating that the runway (60) is closed is buildable using the beacon system (10). However, the reader skilled in the art will readily appreciate that the beacon system (10) can be used to build a variety of symbols and shapes.

Figure 3:
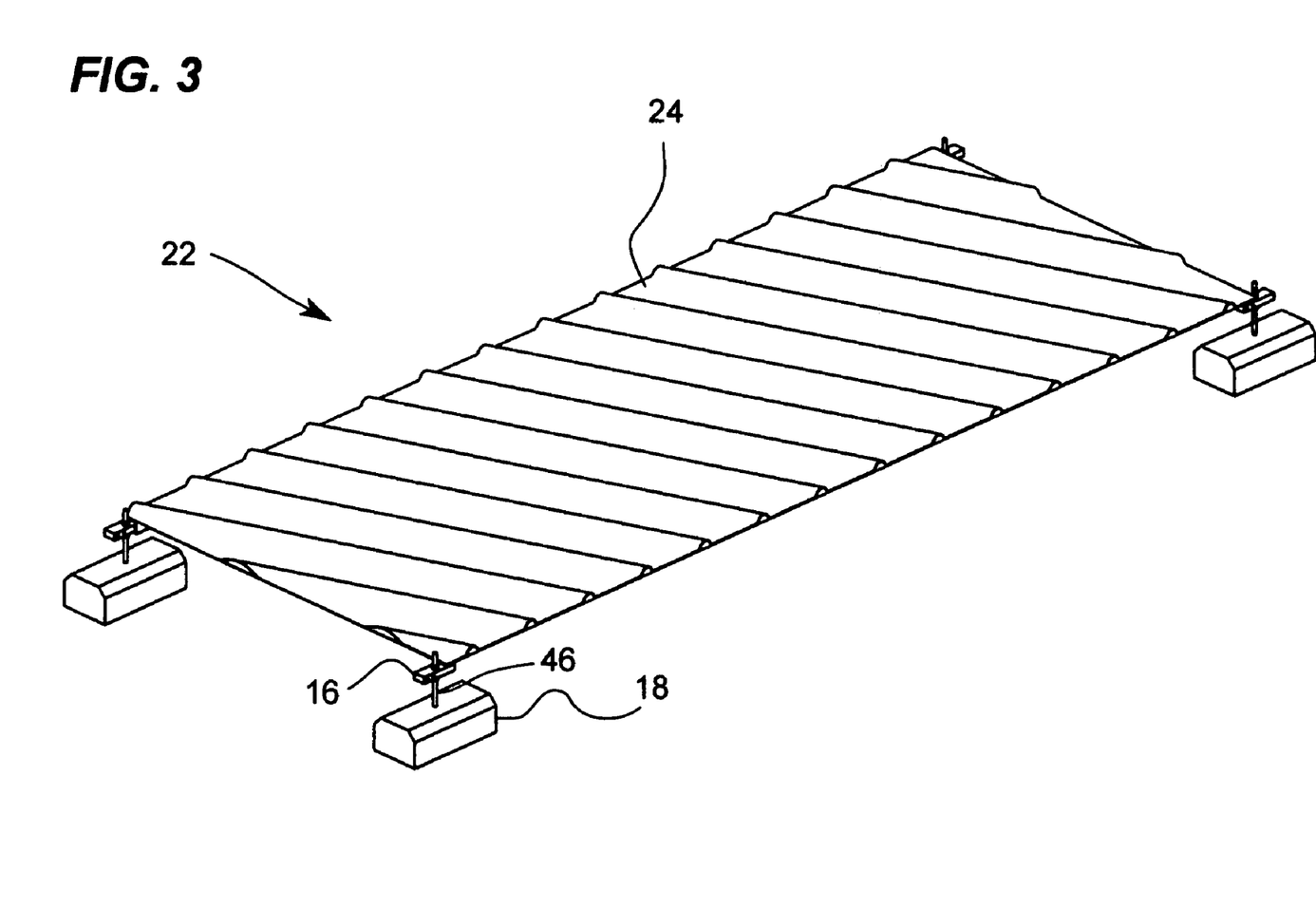
FIG. 3 is a perspective view of a single panel.

As shown in FIG. 3, each module (12) includes a panel (22), attachment means (16), used in connecting adjacent modules (12a, 12b) and an axle (46), which is either connected directly into a footing (18) or to a pole (19) which is itself connected to the footing (18). As better described later, the axles (46) or the poles (19) can be planted directly into the runway (60) without the need for the footings (18). Of course, beacon system (10) can also be installed outside of the runway itself on adjoining ground wherein the axles would be planted into the ground.

Figure 5:
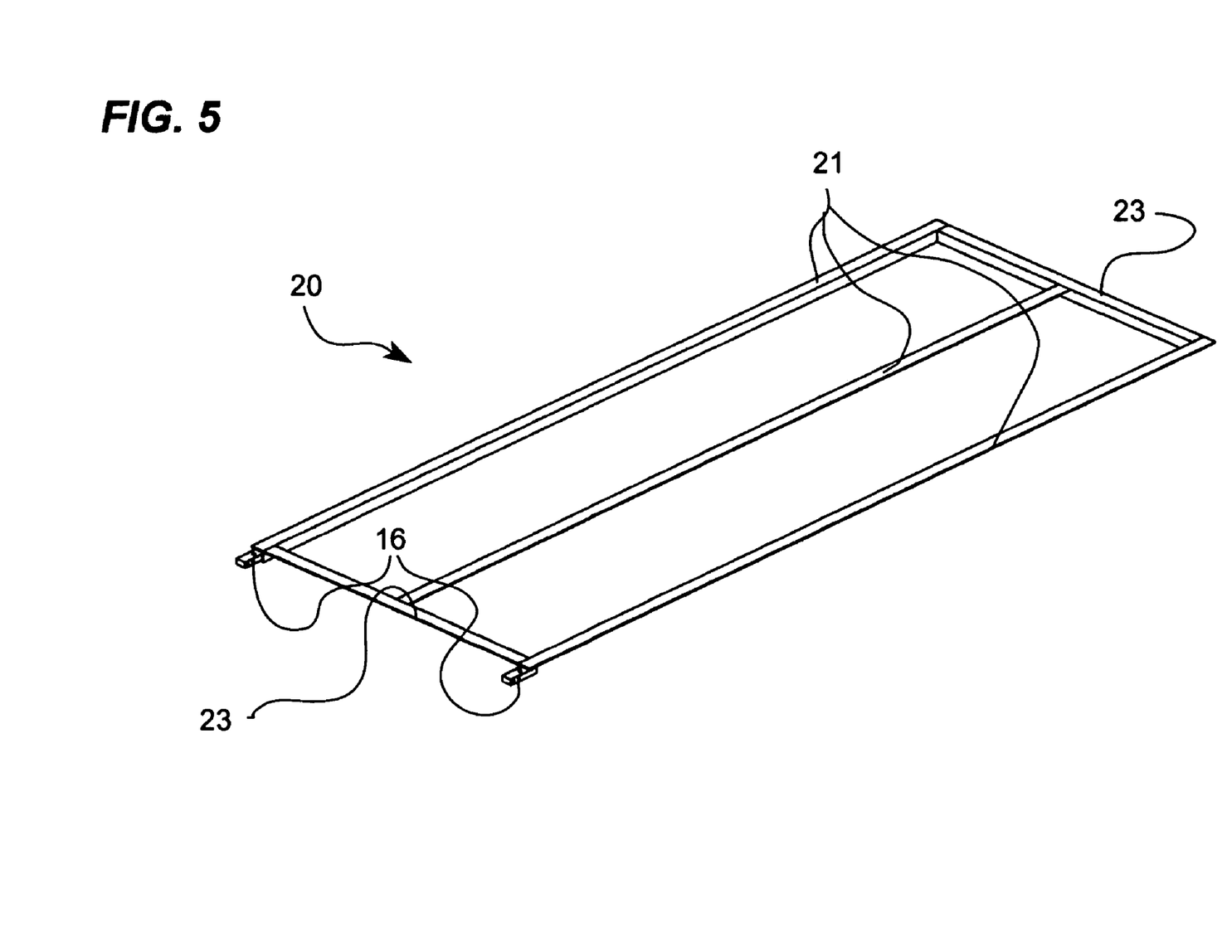
FIG. 5 is a perspective view of the frame of a single panel.

FIG. 5 shows the panel (22) defining a reflecting surface (24) being made reflective by the use of highly reflective materials known in the art. The panel (22) is supported on a frame (20) composed of "L" shaped elongated members (21) running the length of the panel (22) and "L" shaped width members (23) running the width of the panel (22).

Figure 6:
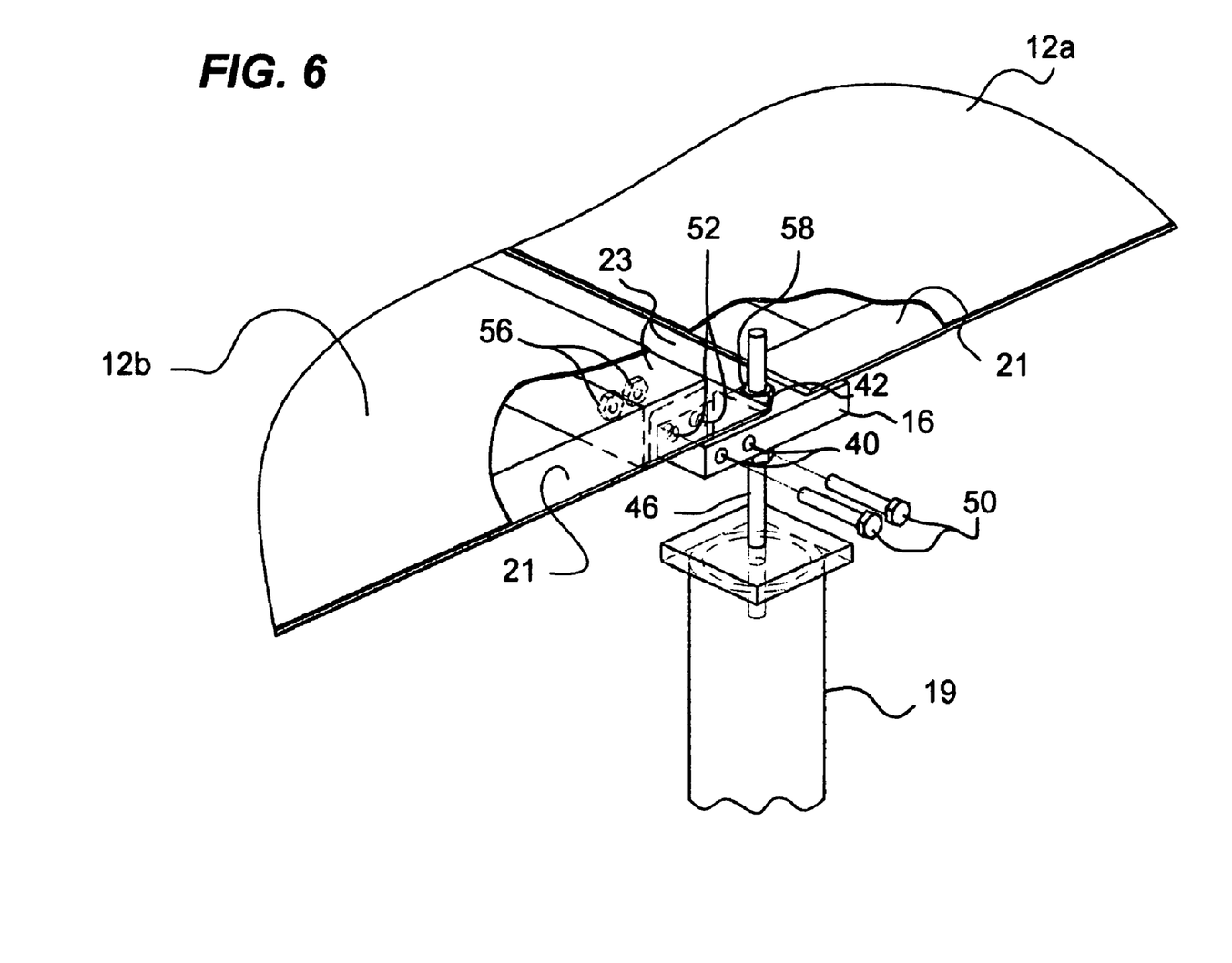
FIG. 6 is a perspective view of the connection details between each panel installed on a pole.
Figure 7:
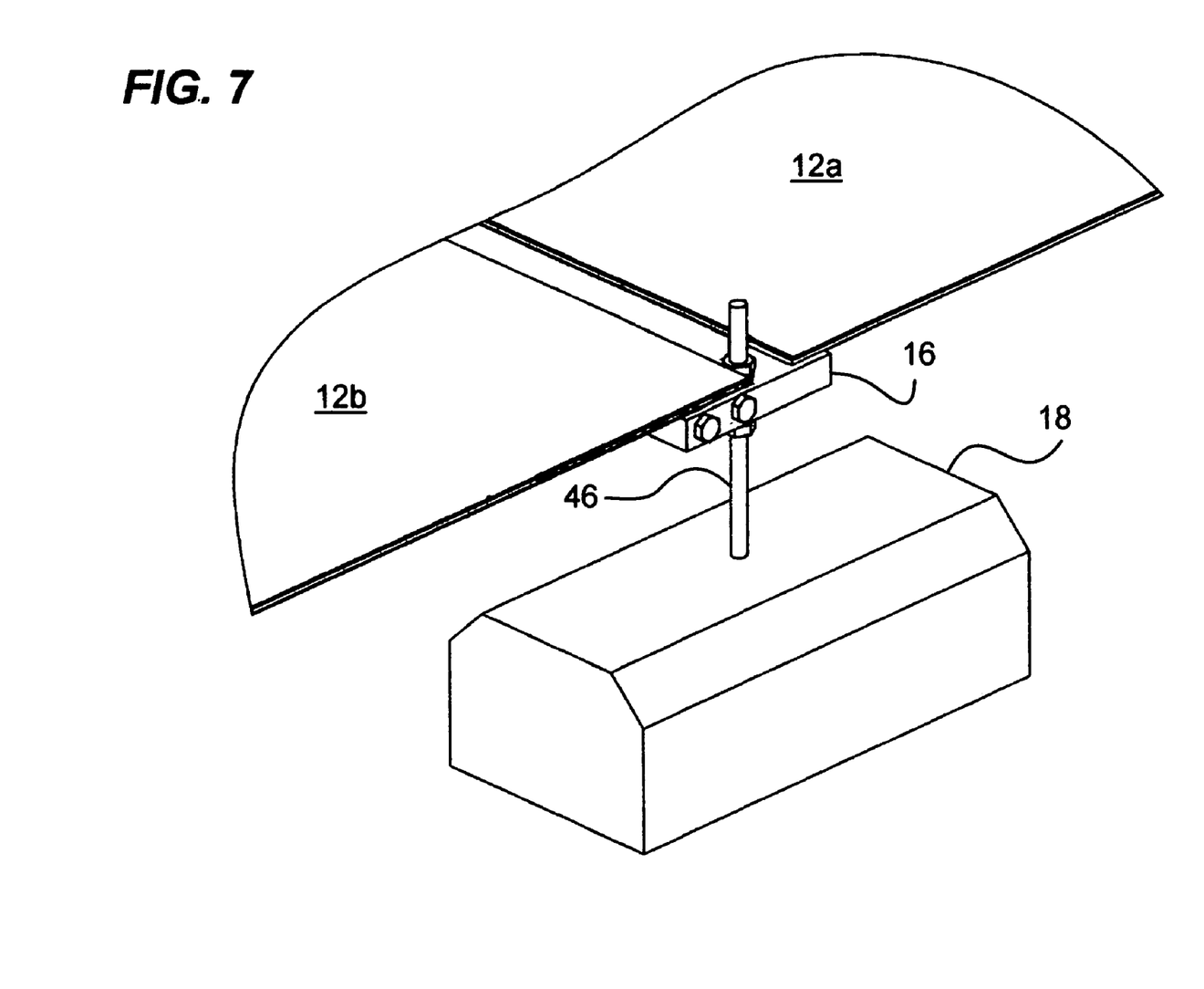
FIG. 7 is a perspective view of the connection between two panels attached to a footing.
Figure 8:
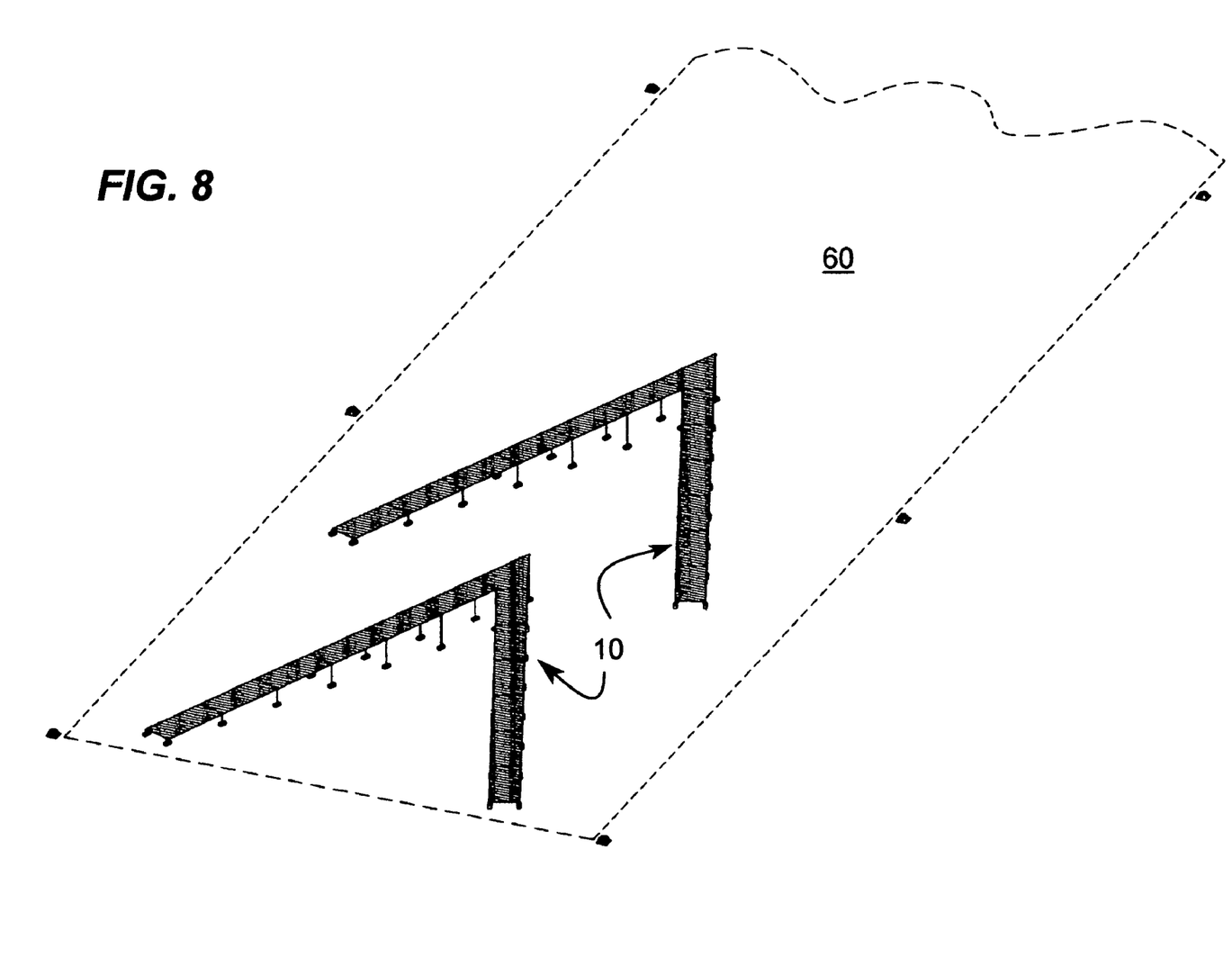
FIG. 8 Isometric view of two symbols located at one end of a runway indicating that the runway is open.
Figure 9:
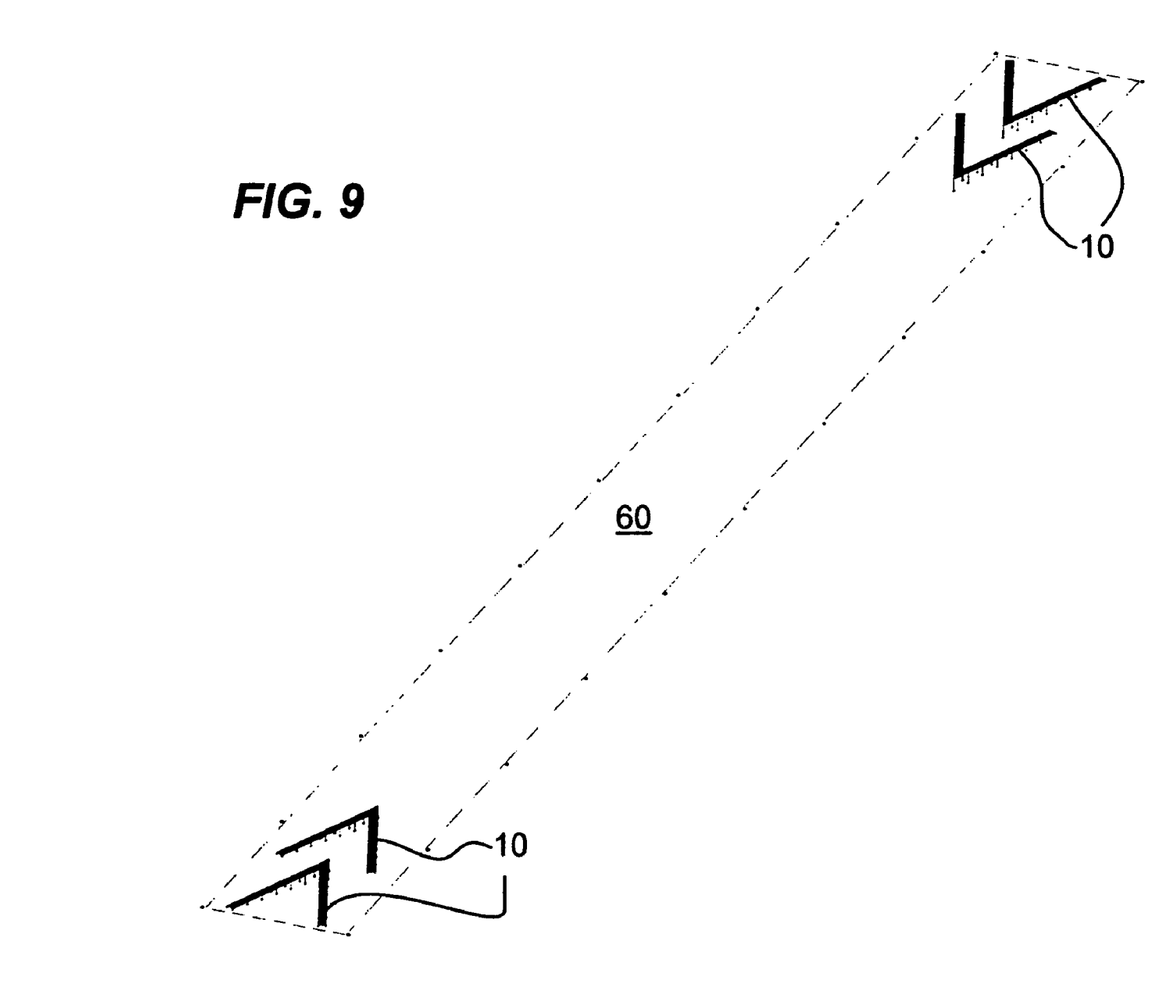
FIG. 9 Isometric view of four symbols located in pairs at each end of the runway indicating that the runway is open.

As better shown in FIG. 6, each module (12) includes two attachment means (16) connected to frame (20). The attachment means (16) each include two module attachment means holes (40) and one axle hole (42) extending therethrough.

Each footing (18) has an axle (46) inserted in it. FIG. 6 shows in greater detail how two modules, (12a and 12b), are connected together and how the footings (18) connect to the attachment means (16). The attachment means (16) of the module (12a) is attached to the elongated member (21) of module (12b) through bolts (50) inserted through attachment means holes (40) and through frame attachment holes (52) made through the elongated member (21). Each bolt (50) is maintained within the attachment means holes (40) and the frame attachment holes (52) by a nut (56).

Since the attachment means (16) is connected or attached to both the modules (12a and 12b), the footing (18) supports both modules (12a and 12b). To that effect, bolts (58) are provided on the axle (46) to maintain the attachment means (16) affixed thereto at a particular location when the axle (46) is inserted into the axle hole (42).

Figure 4:
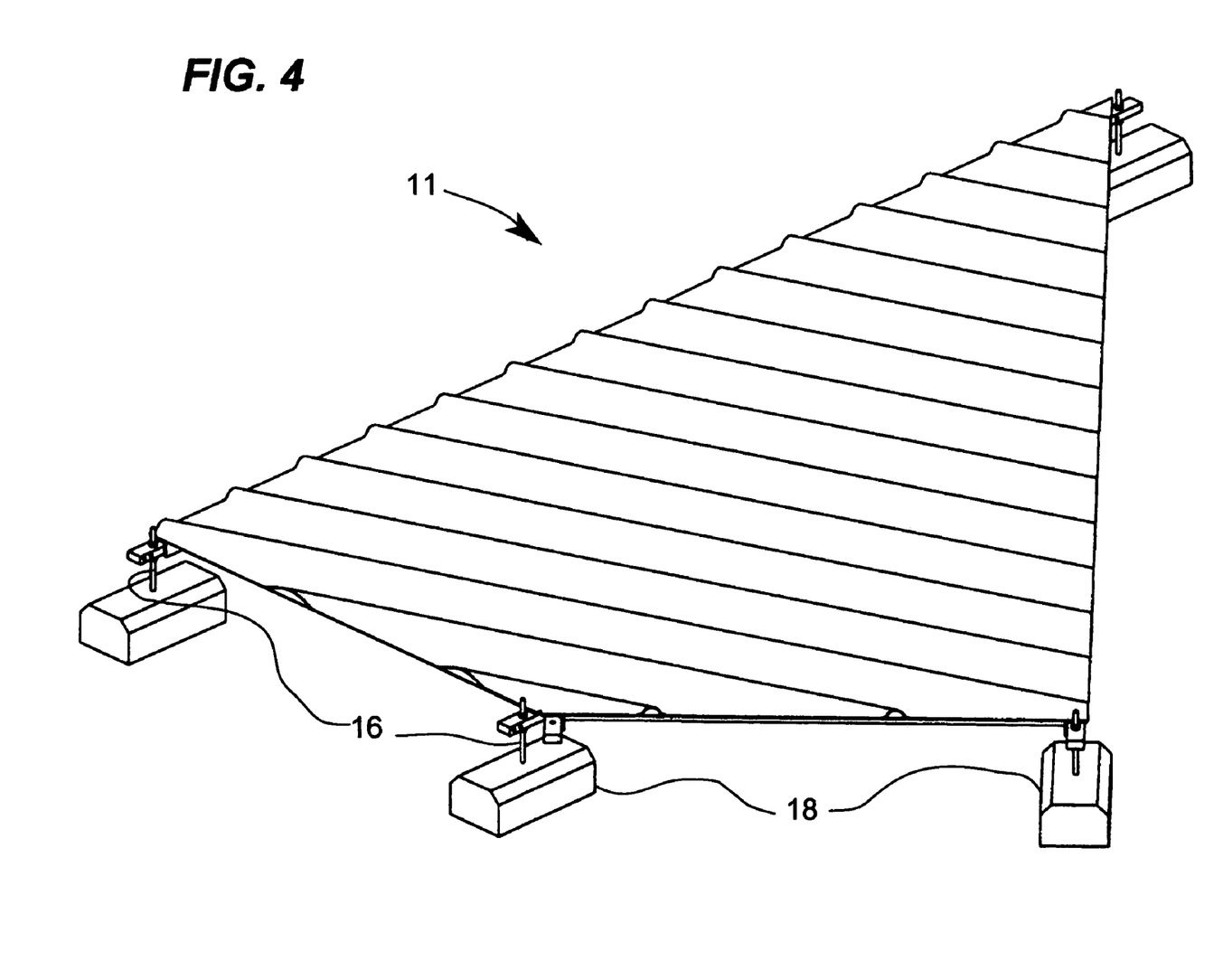
FIG. 4 is a perspective view of a single panel used for the point part as seen in FIG. 2

Since most of the modules (12) are identical and each include two attachment means (16), the reader skilled in the art will readily appreciate that a particular module (12) provided one of two extremities of a plurality of attached modules (12) needs additional material to be supported at one of its extremities, hereinafter the "free" extremity (13) (shown in FIG. 1). To that effect, footings (18) or poles (19) are provided at the free extremity (13), along with the attachment means (16) which are only connected or attached to one module (12) at the free extremity (13). Although rectangular modules are sufficient, in order to provide optimal viewing, various shapes can be created using the same construction methods to provide different connectable module shapes which can help create symbol shapes such as for example module (11) of FIG. 4.

To prepare for use, the beacon system (10) is assembled to form a particular signal as follows. First, all the modules (12) are positioned on the runway (60) to approximately form the signal. Then, the axles (46) and the poles (19) are put in place either by being inserted directly into the runway (not shown) or inserted into footings (18). The modules (12) are mounted onto the axles (46) and the nuts (56) and bolts (50) of the footings (18) are inserted through the attachment means holes (40).

Adjusting the length of the axles (46) allows the adjustment of an angle of the panels (22) in such that they are set at an angle of between 1 and 5 degrees in relation to the runway. The panels (22) oriented in such a way are more visible from the air especially at night when the lights from the plane shine onto the surface of the panels (22), much the way car headlights shine on roadsigns at night. Each panel (22) being angled forces the next connected to it to bet set up higher and the next following that higher still so that if a symbol is 30-40 meters long, depending upon the angle (1 to 5 degrees) the end panels (22) can be anywhere from one to two meters above the runway surface. This means that the axles (46) must be progressively longer until they are extended by way of poles (19). Not illustrated are additional structural dupports such as cross beams since such elements would be obvious to provide stability to the structure. For the sake of simplicity, the most basic structure is shown here.

In specific examples of embodiments of the invention, the modules (12) include a metal such as aluminum. In other embodiments of the invention, the modules (12) include any other suitable material, such as wood, steel or polymers, among others.

While a specific example of implementation of the invention has been shown and described, the reader skilled in the art will readily appreciate that many variations to the above-described modular beacon system (10) are within the scope of the invention.

The attachment means (16) and the footings (18) take any suitable form. In some embodiments of the invention, the footings (18) are not present and the threaded axle (46) is insertable into bores provided directly into the runway.

In other embodiments of the invention, the modules (12) are not attached together through the bolts and nuts (50 and 56). Instead, any other suitable attachment mechanism, such as for example a quick-release mechanism is used. Such mechanisms being well known in the art, they will not be described in further details.

The panels (22) are not substantially flat but have a wave like pattern which makes them visible from a wide range of elevational angles as may be encountered from an approaching airplane as it sets itself for landing.

The reflective material is applied on a substrate which forms an integral part of the reflecting surface (24) by means known in the art.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The invention claimed is:

1. A modular beacon system for use with an airport runway system comprising a plurality of inter-connectable modules, each module comprising a panel member having a light reflective surface; at least two attachment members removably connected to said panel member; and at least two elongated axle members adjustably connected to respective said at least two attachment members at respective distal end portions thereof said at least two axle members adapted to support respective said at least two attachment members and said panel member above a surface of a runway to position said light reflective surface at a chosen angle between 1 and 5 degrees relative to the surface of said runway.

2. The modular beacon system of claim 1, wherein each of said at least two attachment members are adapted to removably connect to a said panel member of an adjacent said module, such that a plurality of said modules are removably connected to one another forming different shapes.

3. The modular beacon system of claim 2, wherein when at least three modules are interconnected they form the shape of a chevron.

4. The modular beacon system of claim 3, wherein a plurality of chevron shapes are formed and used together to form a multiple chevron shape.

5. The modular beacon system of claim 2, wherein when at least four modules are interconnected they form the shape of an X.

6. The modular beacon system of claim 2, wherein said connection between respective said distal end portions of said at least two axle members and respective said at least two attachment members is formed using threads and bolts, such that the axial positions of said at least two axle members with respect to inspective said at least two attachment members are easily adjusted using a rotary motion of said bolts with respect to respective said at least two axle members, such that the angle of respective light reflective surfaces of said panel member are adapted to be easily changed between 1 and 5 degrees relative to the surface of the runway of the airport runway system.

7. A combination of an airport runway and a modular beacon system comprising an airport runway; and a modular beacon system comprising a plurality of inter-connectable modules, each module comprising a panel member having a light reflective surface; at least two attachment members removably connected to said panel member; and at least two elongated axle members adjustably connected to respective said at least two attachment members at respective distal end portions thereof, said at least two axle members support respective said at least two attachment members and said panel member above a surface of a runway to position said light reflective surface at a chosen angle between 1 and 5 degrees relative to the surface of said runway.

8. The modular beacon system of claim 7, wherein each of said at least two attachment members are adapted to removably connect to a panel member of an adjacent said module, such that a plurality of said modules are removably connected to one another forming different shapes.

9. The modular beacon system of claim 7, wherein when at least three modules are interconnected they form the shape of a chevron.

10. The modular beacon system of claim 9, wherein a plurality of chevron shapes are formed and used together to form a multiple chevron shape.

11. The modular beacon system of claim 7, wherein when at least four modules are interconnected they form the shape of an X.

12. The modular beacon system of claim 7, wherein said connection between respective said distal end portions of said at least two axle members and respective said at least two attachment members is formed using threads and bolts, such that the axial positions of said at least two axle members with respect to respective said at least two attachment members are easily adjusted using a rotary motion of said bolts with respect to respective said at least two axle members, such that the angle of respective light reflective surfaces of said panel member are adapted to be easily changed between 1 and 5 degrees relative to the surface of the runway of the airport runway.

13. The modular beacon system of claim 12 wherein end portions opposite of said distal end portions of said at least two axle members are implanted directly into said runway.

* * * * *